United States Patent [19]
Ahlquist, Jr. et al.

[11] Patent Number: 5,361,333
[45] Date of Patent: Nov. 1, 1994

[54] SYSTEM AND METHOD FOR GENERATING SELF-OVERLAPPING CALLIGRAPHIC IMAGES

[75] Inventors: John B. Ahlquist, Jr., Garland; James R. Von Ehr, II; Samantha Seals-Mason, both of Plano, all of Tex.

[73] Assignee: Altsys Corporation, Richardson, Tex.

[21] Appl. No.: 893,840

[22] Filed: Jun. 4, 1992

[51] Int. Cl.⁵ .............................. G06F 15/40
[52] U.S. Cl. ......................................... 395/142
[58] Field of Search ............. 395/150, 151, 141, 142, 395/143; 340/728, 732, 734, 735; 345/180, 181

[56] References Cited
U.S. PATENT DOCUMENTS 4,905,166 2/1990 Schuerman .................. 364/518
5,115,479 5/1992 Murayama ................... 382/56
5,189,730 2/1993 Kajimoto ..................... 395/142

OTHER PUBLICATIONS

Fontographer Software Package Version 3.5 Documentation Copyright 1992 Altsys Corporation.
Aldus ®FreeHand ™ 1.0, Jan. 1988 (Documentation).

Primary Examiner—Phu K. Nguyen
Attorney, Agent, or Firm—Winstead Sechrest & Minick

[57] ABSTRACT

A system and method for generating self-overlapping calligraphic images from an input source. The input can be a stylus and the angle of attack of the line with respect to a surface can be fixed or variable. The calligraphic image can have a fixed or variable width which can be point-by-point edited to form a new calligraphic image. The system has the ability to expand a calligraphic image with overlapping strokes and subsequently edit the image.

42 Claims, 7 Drawing Sheets

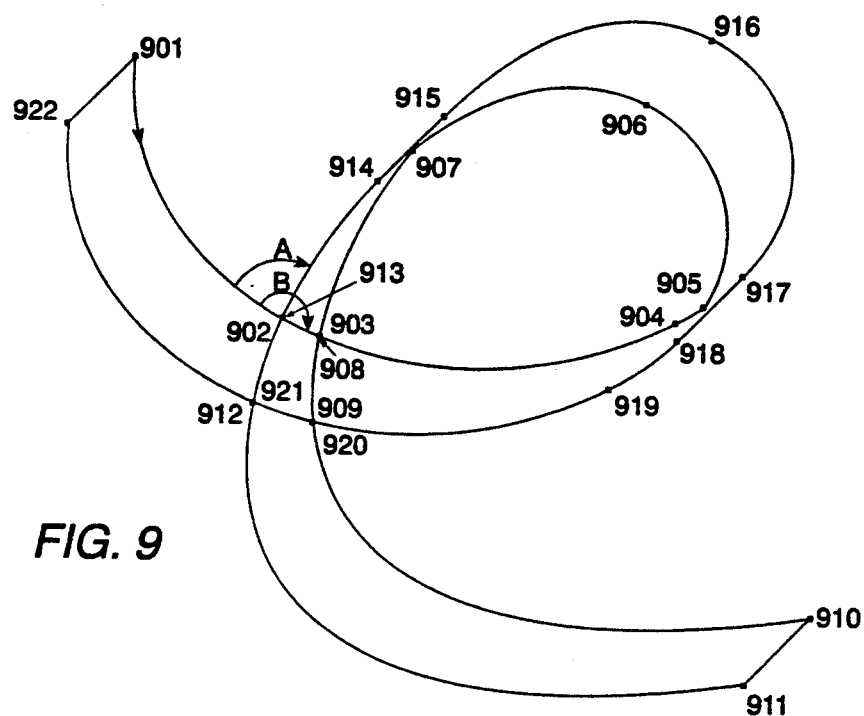
FIG. 9
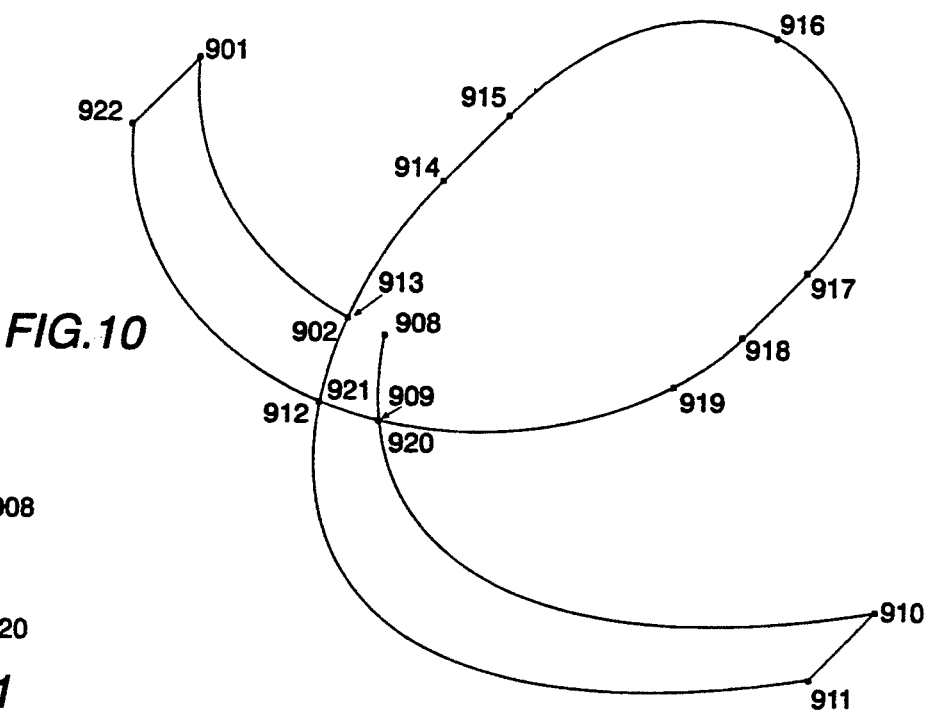
FIG.10
902• •908
912• •920
FIG.11

SYSTEM AND METHOD FOR GENERATING SELF-OVERLAPPING CALLIGRAPHIC IMAGES

TECHNICAL FIELD OF THE INVENTION

This invention relates to graphic presentations and more particularly to a system and method for generating self-overlapping calligraphic images.

BACKGROUND OF THE INVENTION

Calligraphy is an ancient drawing form and derives its name from beautiful or elegant penmanship. On paper a calligraphic stroke is created by a type of pen called a calligraphic pen which has a long narrow nib which allows ink to flow onto the writing surface. There is a basic "grammar" of movements of the calligraphic pen, called strokes, which in proper combinations produces recognizable letter forms or flourishes. The stroke needed to create a calligraphic letter is called its "ductus," from Latin "to draw." A single stroke is created by using one or all of the following traditional techniques: (1) changing the angle of the chiseled nib; (2) changing the pressure of the nib, thus allowing more ink to flow or widening the nib to allow more ink to cover more surface of the paper; and (3) changing the direction of the nib from right to left and up and down. It is the calligrapher's skill in working the interaction of the physical characteristics of the pen with its stroking techniques that ultimately produces calligraphy.

In modern computer systems, a problem results when a user wishes to generate on a computer screen (or on a printer) a curve representative of a calligraphic stroke. One could simulate static calligraphic paths by any manner of methods on the screen. However, to model the direct stroking is quite another task.

Soon after the advent of high-resolution screens and graphical user interfaces, one could find bitmap based "painting" programs containing "brushes" for calligraphy. These "brushes" allowed only a static or unchanging angle. However, one could choose from a pallet of "brush" angles, but the system did not allow for the measuring of pressure for changing the width of the nib. A problem would arise when a mistake was made or one wanted to alter a path. To make corrections meant removing and/or adding pixels to the bitmap image, not a quick process or an easy one. The "brush" movements were accomplished by using a new device called a mouse, producing not very smooth or true freestyle strokes. One could use a graphics "tablet" to aid in producing freestyle strokes; however, nothing else was available for this task.

Thereafter, vector-based "drawing" programs arrived. With these programs a calligraphic path could be hand-built by carefully adding enough points to a path to make it look smooth. This was a tedious and slow process for something which should be simple and direct. Unless one understood the mathematics behind a calligraphic path, one could not accurately model the path's change in angle, pressure or direction. These programs had no pallet "brushes" either. The one key benefit was that a user could make corrections easily and rapidly. Using a graphics tablet provided only speed improvements and more accurate point placement, particularly for tracing.

Finally, the vector-based "drawing" programs moved to using Bezier curves. This new method of creating paths provided speed, ease of use and more accurate modeling of calligraphic strokes. A user could simulate change in angle, pressure and direction. However, one still did not have direct stroking of the path as a whole, only its "control" points used to define the path. Again, using a graphics tablet provided only speed improvements and more accurate point placement. Ideally, a user would want the ease of stroking that a bitmap program provides with the ease of editing a vector-program offers.

One characteristic of a calligraphic pen stroke is that the nib is carried at a specific angle, thus the beginning of a line stroke and the end of that line stroke should have the same angle with respect to the paper or screen.

In the prior art this is not the case. In such prior art systems the angle of the stroke at the end of the stroke does not match the angle of the stroke at the start point. While the precise reasons for these mismatches are known only to the system programmer, they certainly leave a very fundamentally inaccurate and unsatisfying image on the screen or on an electronically printed reproduction.

Accordingly, there is a need in the art for a system and method of creating calligraphic strokes from an off-screen input source, when the source provides data points pertaining to length, direction, angle of attack and line width.

A problem results when a calligraphic stroke crosses over a previous stroke, such as when the user makes an "x", or when the stroke crosses back over itself, such as when the user makes an "e." These are special cases, each of which requires special solutions, particularly if the user is going to edit the stroke and add modifications thereto.

Further problems result when editing is desired to change the width or stroke of the character. The fact that strokes have crossed over themselves creates a difficult task for editing.

Another very serious problem is that often it is desired to perform geometric operations on the calligraphic images, and when they cross over themselves or intersect it is very difficult to perform any of these geometric operations.

A further problem that must be resolved is the removal of self overlap in a figure. Bezier curves present a special problem because Bezier curves can intersect in many different places. This problem has been solved in other systems for straight lines which can intersect at one point or circular arc segments which can intersect in at most two points. Apple Computer has solved it for quadratic lines which again can intersect at most at two points. However, finding the intersection of Bezier curves is a much harder problem. For example, a software system known commercially as Fontographer could not remove the overlap from self-intersecting figures and could not construct all Bezier curves.

SUMMARY OF THE INVENTION

These and other problems have been solved by a system and method which allows for the creation of the outline of a self-overlapping calligraphic movement and which also provides for a same start and stop angle with respect to the image. The system takes as an input a Bezier curve and calculates the calligraphic outline of the curve based on the input curve and accounts for the changing of the width of the pen based on the angle by calculating where the angle of the curve matches the angle of the pen and at those locations it handles problems that would be caused by the curve overlapping itself.

In operation, as the calligraphic stroke is being generated by the user, the image is initially created as an approximation of the line so that the user may see the image being formed in real time. However, in actuality the system creates the center line, or spine, of the resultant image. The system is designed to look ahead to see where the curve is moving to determine where the outline should be. When the user is finished creating the curved shape, the system operates to construct the outline of the calligraphic image from the created center line. The system then displays on a screen the outline of the calligraphic image having points along the outline periphery which then can be manipulated by the user for the purpose of editing and performing geometric functions with respect to the created line.

In the situation where two calligraphic images overlap, the area of the overlapping strokes has to be removed. In many cases, the two curves can be combined into a single curve that covers the same area, which simplifies the figure. En other cases it can be decomposed into two or more figures that do not cross each other. This is accomplished with an algorithm that examines all the curves in the one or more figures that overlap and identifies the curves that cross. At the points where the curves cross, the curve is subdivided and an insertion point is added at the location that the curves cross. Once this is done, a starting point is chosen and the curves are "walked" around from point to point. When an intersection point between two curves is located, there are two curves that cross and the algorithm must choose between one of the curves. The curve that is to the outside of the two figures is chosen. Both figures are walked around their outsides until returning to the original point, thus generating a path that walks around the edge in periphery of the figures.

One technical advantage of our system is that a user can move a stylus across a pad and along with various other input sources can create calligraphy with overlapping strokes for complex letter forms or other drawings.

Another technical advantage of our system is the creation of a graphics system which, depending upon line width and angle information, creates an outline of the desired overlapping calligraphic image on a screen, such that the image contains points editable for controlling subsequent outlines of images.

A still further technical advantage is that our system allows a user to create calligraphic strokes from an off-screen input source, when the source provides data points pertaining to length, direction, angle of attack and line width.

A still further technical advantage of our system is to construct the outline of an overlapping calligraphic image from a created center line. The system then displays on a screen the outline of the calligraphic image having points along the outline periphery which then can be manipulated by the user for the purpose of editing and performing geometric functions with respect to the created line.

A still further technical advantage of the present invention is the font generating capabilities consisting of calligraphic curve characteristics.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 9 shows FIG. 2 with additional points inserted at each point that the two curves cross;

FIG. 10 shows the path from FIG. 9 after the first path has been walked;

FIG. 11 shows the remaining points after FIG. 10 is walked;

DETAILED DESCRIPTION OF THE INVENTION

Figure 1:
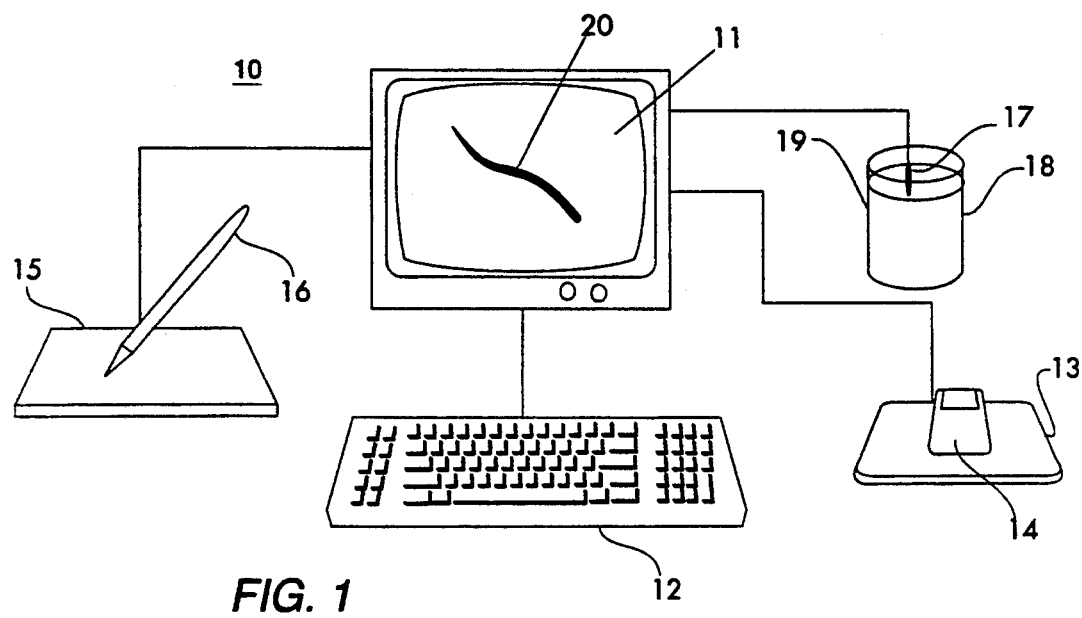
FIG. 1 shows an overall system utilizing our system and method for generating self-overlapping calligraphic curves.

Turning now to FIG. 1, there is shown a representative system 10 for implementing the principles of the present invention which has in it, in one example, a computer graphics display 11 and keypad 12. Also connected to computer graphics display 11 is mouse 14 with its associated pad 13 and also connected to the computer graphics display 11 is pressure sensitive tablet 15 and its associated pen 16 and also connected to the computer graphics display 11 is a reservoir 18 containing a fluid 19 with its associated stylus 17. Displayed on the screen is a calligraphic image 20 created in any number of different ways, either from the keypad 12 or from a mouse 14 or from a stylus 16 moving across a tablet 15. In addition, there are many other methods in which such an image can be created using the principles of our invention.

Before beginning, the reader is referred to copending U.S. patent application, Ser. No. 07/833,977, entitled "A System and Method for Generating Real Time Calligraphic Curves," hereby incorporated by reference herein, to understand how calligraphic images are constructed.

For an understanding of the creation of variable width lines, the reader is referred to copending patent application, Ser. No. 07/833,957, entitled "A System and Method of Generating Variable Width Lines," hereby incorporated by reference herein.

For an understanding of the creation of complex calligraphic images, the reader is referred to concurrently filed copending patent application, Ser. No. 07/894272, entitled "A System and Method for Generating Complex Calligraphic Curves," hereby incorporated by reference herein.

To produce the calligraphic outlines described in the present invention, the reader may purchase the "FONTOGRAPHER" software package available from Altsys Corporation, 269 W. Rennet Road, Richardson, Tex. 75080, hereby incorporated by reference herein. The calligraphic outlines may be utilized in creating fonts for printing.

Additional information required for the calligraphic expansion is the angle of the calligraphic pen which could be specified in a dialog box on the screen. Once established in the system, this angle may remain constant as the user moves the pen across the pressure sensitive tablet or as the user inputs information from the keypad and mouse. As will be seen the user can specify a constant width for the line or can specify that the line will be dependent upon the amount of pressure applied to the pen or upon keys inputted from the keyboard.

Before proceeding further, several definitions of terms to be used in this description are required.

"Curve" in this discussion is a Bezier curve specified by two end points that the curve passes through, and two control points that the curve does not pass through. In the figures, the points shown are the end points. The control points are not shown, but their location can be derived from the shape of the curve. A Bezier curve can be a straight line between the end points, so in this discussion the term curve includes lines.

A calligraphic stroke has 2 "sides" and 2 "ends." The ends are lines that are the width and angle of the pen. The sides consist of one or more curves.

Figure 2:
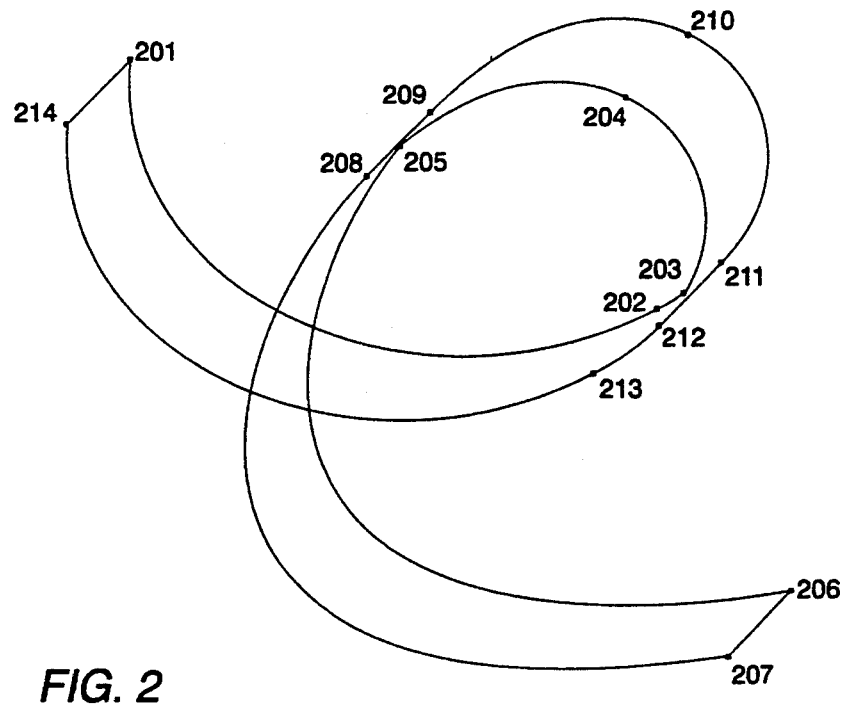
FIG. 2 shows a calligraphic path that crosses itself.

Referring now to FIG. 2, there is shown a path that overlaps itself. This path was created by calligraphic expansion; however the source of the path is not significant. The figure has a number of corners.

Figure 3:
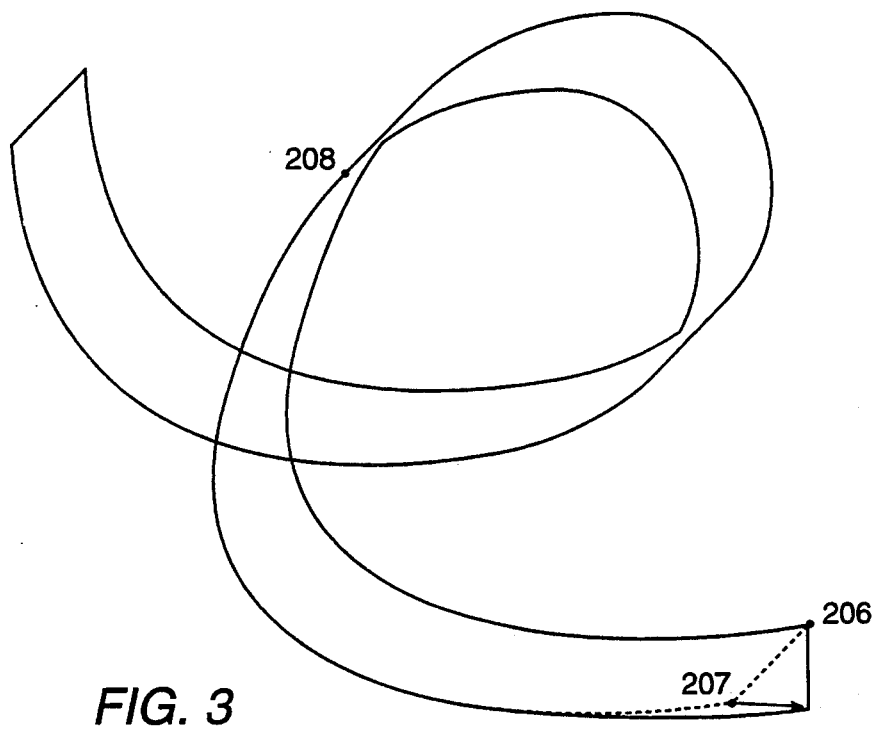
FIG. 3 shows an adjustment of a corner point.

FIG. 3 shows how points at a corner, such as 207, can be adjusted by moving the corner point. Note that the corner has been changed in FIG. 3 by moving point 207. Moving the corner is simple, and does not affect the location of the corners at 206 and 208.

Figure 4:
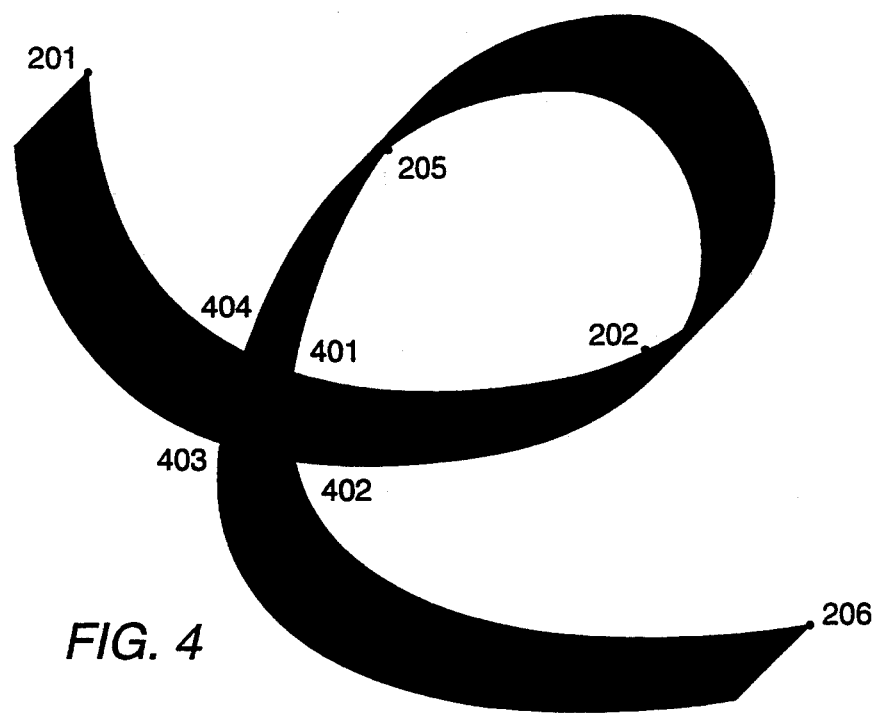
FIG. 4 shows FIG. 2 as a filled image.

FIG. 4 shows FIG. 2 as a filled image, which is how the path would often be used. Note that because the path overlaps, there are corners at 401, 402, 403 and 404 that do not have a corresponding point in the path. This makes editing the corner very difficult, as there is no point at that location to move. In order to edit the corner at 401, the curves at [205, 206], and [201, 202] of FIG. 2 must be adjusted.

Figure 5:
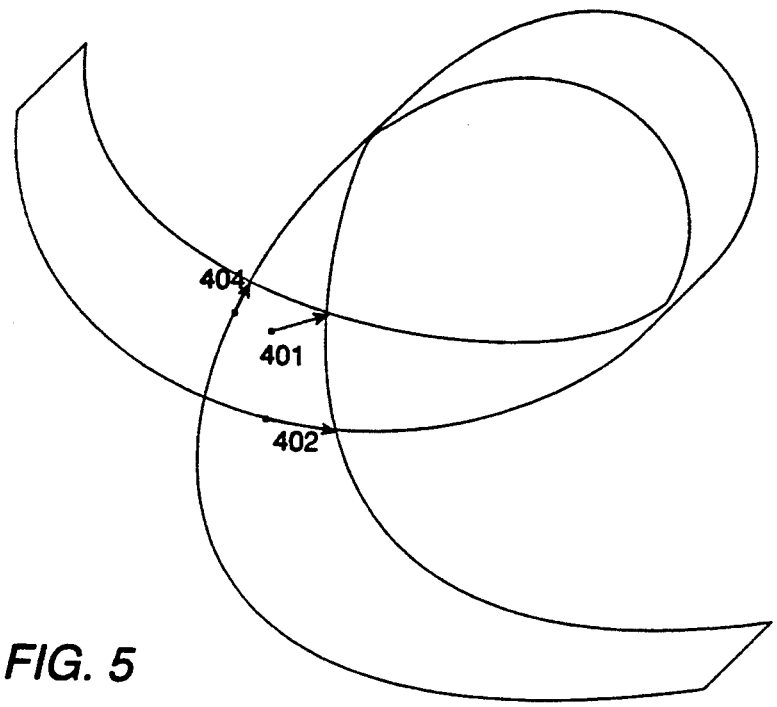
FIG. 5 shows the editing of a corner at a cross-over point on an overlapping image without utilizing the method of the present invention.

FIG. 5 shows the corner at 401 moved up and to the right. Note that the corners at 404 and 402 have moved as well. Since the corners are at the intersections of curves, changing the curve to change one corner changes the other corners as well. In addition, the change in location of the other corners is not the same change as the change in location intentionally applied to corner 401. This is generally not desirable, and makes certain kinds of edits impossible, such as changing corner 401 without changing corners 404 and 402.

Figure 6:
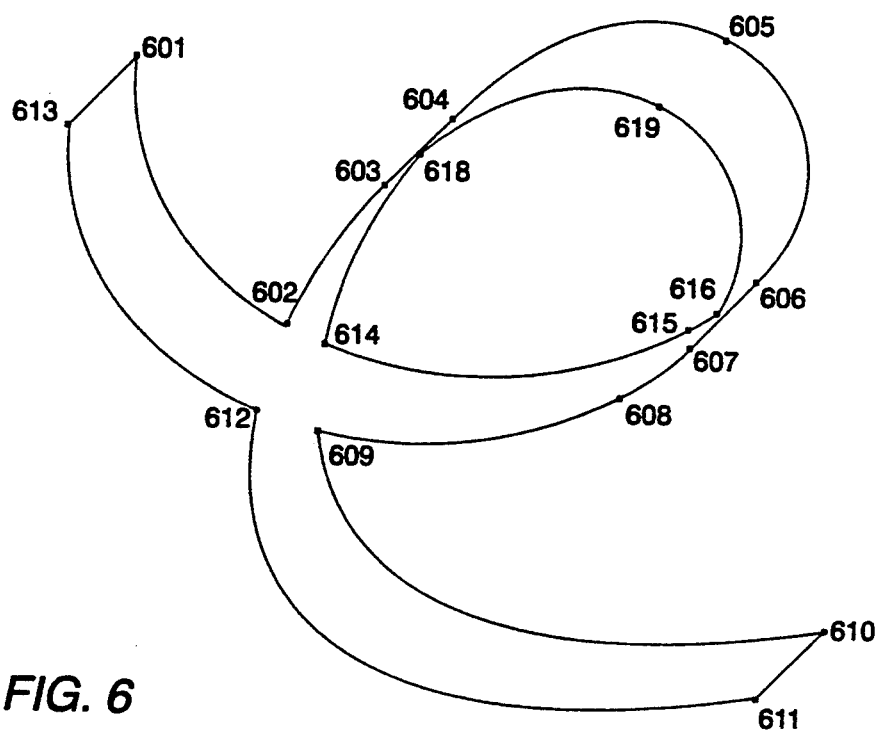
FIG. 6 shows two paths that produce the same filled image as FIG. 2 but do not cross.

FIG. 6 shows two paths that produce the same filled image as FIG. 2, but do not overlap. As a result, all corners in the image have a corresponding corner point in the paths. In this figure, the corner that was located at 401 in FIG. 4 is located at point 614 in this figure.

Figure 7:
FIG. 7 shows FIG. 6 as a filled image.

Next, FIG. 7 shows FIG. 6 as a filled image. Note that it is the same filled image as FIG. 4.

Figure 8:
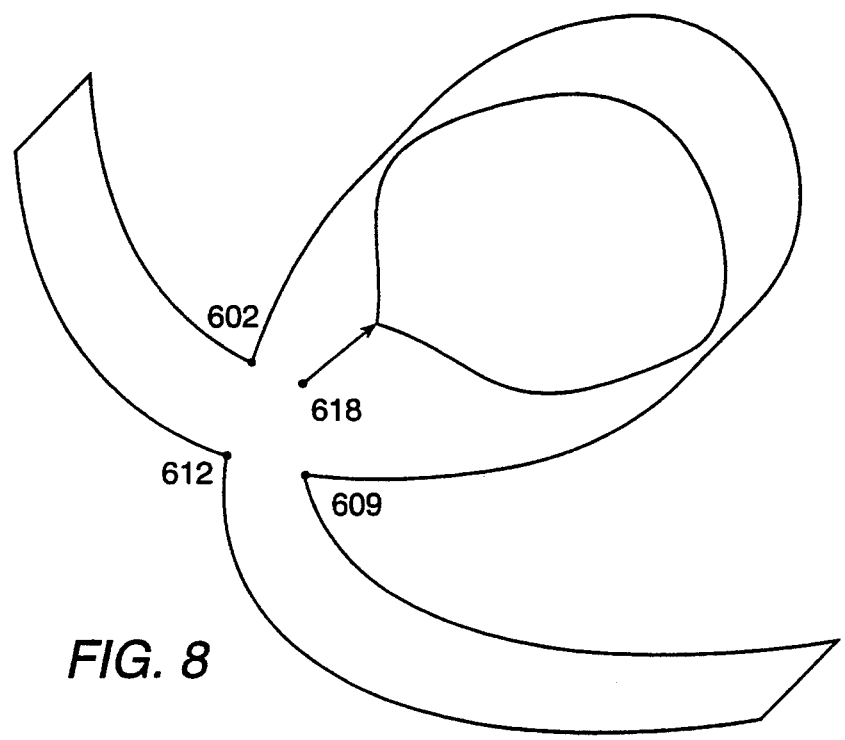
FIG. 8 shows FIG. 6 with corner 618 moved to the same location 401 was moved to in FIG. 5.

FIG. 8 shows FIG. 6 with corner 618 moved to the same location corner 401 was moved to in FIG. 5. Note that this does not change the position of corner 602 (which corresponds to corner 404), or corner 609 (which corresponds to corner 402). This is a much more desirable editing result, as each corner can be edited individually without affecting the position of the other corners.

Referring next to FIGS. 9-11, there is illustrated the process of converting FIG. 2, a path that overlaps, to FIG. 6, two paths that do not overlap, but producing the same filled image as FIG. 2.

FIG. 9 shows FIG. 2 with additional points inserted at each point that two curves overlap. The first curve originally went from 901 (which corresponds to 201) to 904 (which corresponds to 202). Since it crosses two curves, two points were inserted and the curve goes 901, 902, 903, 904. After all points are inserted, they are examined for points that have the same location. In this figure, points 902 and 913 have the same location, 903 and 908 have the same location, 909 and 920 have the same location and 921 and 912 have the same location. Each point that has the same location as another point will be marked as an INTERSECTION point. These points will be handled in a special fashion as described later. Note also that the image is clockwise. This means that as curves are examined, the inside of the image is on the clockwise side of the curve, or right side. The outside of the image is on the counterclockwise side of the curve, or left side. If the points are followed backwards, from 922 to 901, then the image is counterclockwise and the inside is on the counterclockwise side, or left side. To process a counterclockwise image, reverse the order of the points, and process as a clockwise image. When finished, reverse the points of the resulting paths.

A user of the system of the present invention will utilize one of the input devices such as the pen and pressure sensitive pad to draw calligraphic images such as the ones depicted in FIG. 2 through 9. When a user draws such an image, the system will store the image as a Bezier curve as previously described. The Bezier curves define the boundaries of the calligraphic image. However, as previously described, editing of the image is not easily accomplished since moving a point where the curves intersect distorts the calligraphic image into an undesirable shape. The present invention solves this problem using an algorithm described in the flowcharts of FIGS. 12 and 13 to create another image as depicted in FIG. 6 exactly the same as the one shown in FIG. 2 but without the curves actually overlapping each other.

Figure 12:
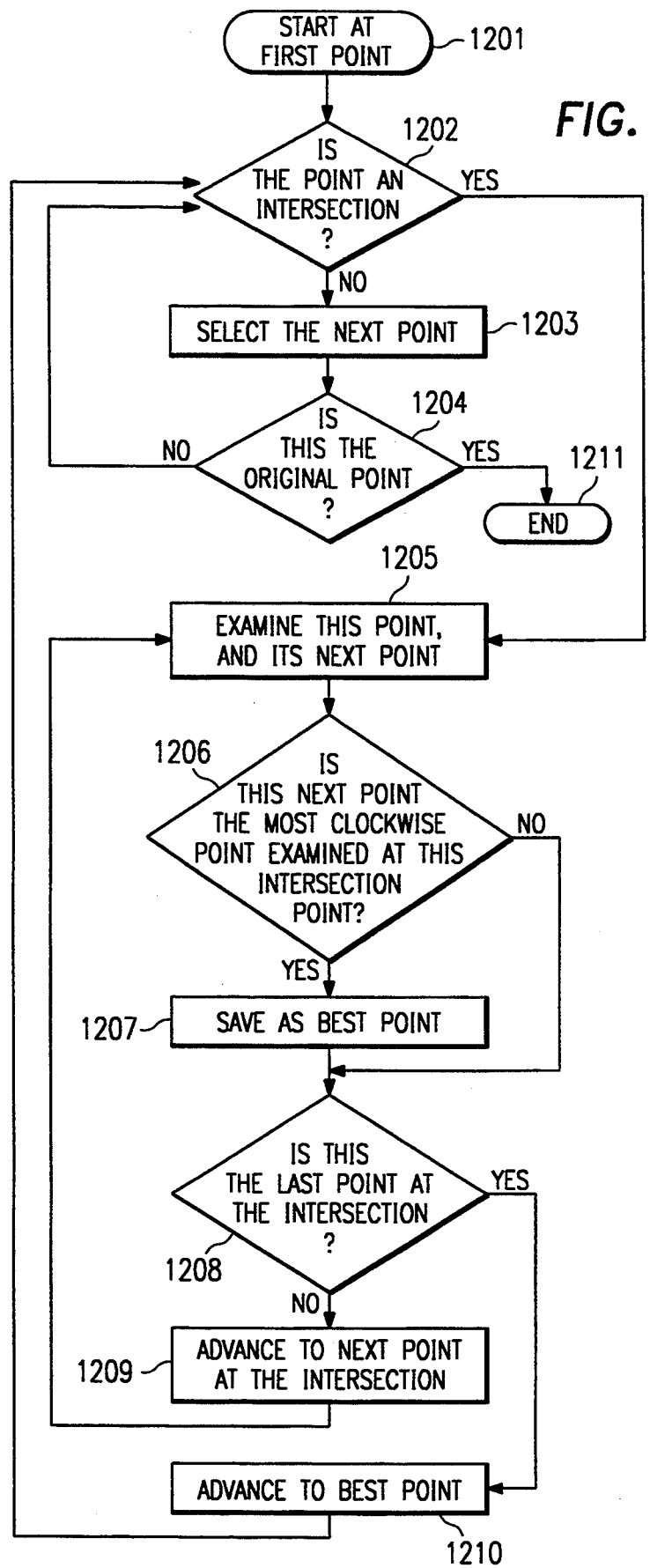
FIG. 12 shows a flowchart of the path walk algorithm.
Figure 13:
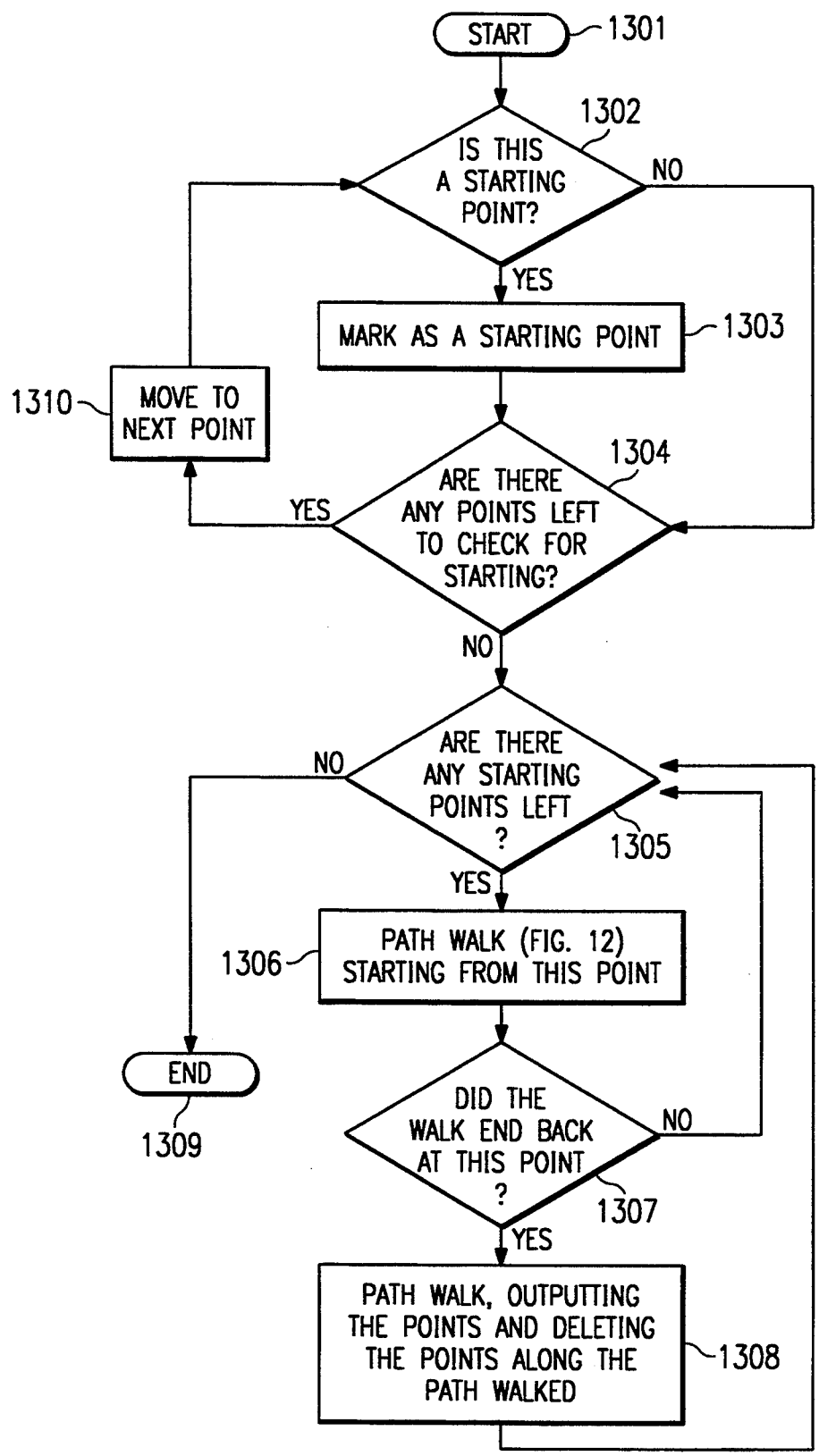
FIG. 13 shows a flowchart for generating self-overlapping calligraphic curves.

Referring to FIGS. 12 and 13 and the calligraphic image of FIG. 9 with the additional intersection points, the system creates the non-overlapping replica of the overlapping calligraphic image using a path walk algorithm wherein the curves defining the boundary of the calligraphic image are "path walked" whereby each point "walked" is specially "marked" or placed in another memory location for creating the non-overlapping calligraphic image as depicted in FIG. 6. Beginning at step 1301 of FIG. 13, the algorithm is started. At step 1302, the system inquires whether the first point along the image is a starting point. A starting point is an intersection point whose curve goes outside of the curve it intersects. In FIG. 9, points 903 and 908 are intersection points. Since the curve 903 to 904 is outside, or counterclockwise, from the curve 907, 908, 909, point 903 is a starting point. The curve 908 to 909 is inside, or clockwise, from the curve 902, 903, 904. Therefore, point 908 is not a starting point. In FIG. 9, points 903, 909, 913 and 921 are starting points.

Returning to the algorithm of FIG. 13, at step 1302 the system asks whether a point is a starting point. In FIG. 9, 901 is not a starting point. Therefore, the system proceeds to step 1304 and asks whether there are any points left to check for starting. Since points 902 through 922 are left, the system moves to the next point at step 1310 to evaluate whether or not it is a starting point at step 1302. Again, 902 has not been determined to be a starting point, so the system again returns to step 1304 to ask whether any points are left for starting. Since there are, at step 1310 the system moves to the next point in FIG. 9, which is 903. At step 1302, the next point is determined to be a starting point. Therefore, the system proceeds to step 1303 to mark this starting point to utilize within the path walk algorithm of FIG. 12. This process continues through every point of the calligraphic image (points 901 through 922 in FIG. 9), until all the starting points are marked. When there are no more starting points left to check, at step 1304 the system proceeds to step 1305 to begin utilizing the path walk algorithm of FIG. 12. At step 1305, the system asks whether there are any starting points to utilize in the path walk algorithm. Since in this case there are four starting points, the system proceeds to step 1306 to utilize the path walk algorithm of FIG. 12.

Referring now to FIG. 12, the system starts at the first point at step 1201, which is 903 of FIG. 9. At step 1202, the system determines whether this point, 903, is at an intersection. Since it is, the system proceeds to step 1205 to examine this point at this intersection point and to examine this point's next point. The first point to be examined will be point 903 in FIG. 9, and its next point 904. At step 1206, the system asks whether this next point, 904, is the most clockwise point examined at this intersection point looking clockwise from curve 903 to 904. Since 904 is the most clockwise point, at step 1207, point 904 is saved as the Best point. At step 1208, the system asks whether 903 is the last point at the intersection. Since it is not, at step 1209 the system advances to the next point at the intersection, this point being 908. Next, at step 1205, the system examines 908, and its next point, 909. At step 1206, point 909 is determined whether or not it is the most clockwise point examined at this intersection point from the curve 903, 904 being examined. Beginning along the curve 903, 904 and examining clockwise from that curve, it can be determined that 909 is not the most clockwise point examined at this intersection point since 904 remains as the most clockwise point. Therefore, at step 1207, 904 remains as the Best point.

At step 1208, the system again asks whether this is the last point at the intersection. Since all of the points have been examined, the systems moves to step 1210 where the algorithm then advances along the curve to the Best point, 904.

It should be remembered that as each point is walked, it is "marked" or transferred to another memory location as previously discussed.

After step 1210, the system returns to step 1202 to determine whether this next Best point is at an intersection. Since it is not, the system selects the next point at step 1203, the next point being 905. At step 1204, the system determines whether this next point is the original point, point 903. Since it is not, the system moves to step 1202 to determine whether point 905 is at an intersection point. Since it is not, the system then moves to point 906 at step 1203. At step 1204, the system again asks whether point 906 is the original point. Since it is not, the system returns to step 1202 to ask whether point 906 is at an intersection. Since it is not, at step 1203 the system selects point 907 as the next point. Again at step 1204 it is asked whether 907 is the original point. Since it is not, the system again cycles through steps 1202 through 1204 until point 908 has been reached. Since 908 is at point 903, which is the original point, step 1211 ends the path walk algorithm.

Returning to FIG. 13, the system returns to step 1306 and moves on to step 1307 to ask whether the path walk ended back at the original starting point 903. If it had not, the system would have returned to step 1305 to ask whether there were any other starting points left. However, since the path walk algorithm did end at the original starting point, the system moves to step 1308 to output all of the points walked, or to simply "mark" them within the memory, and to delete these points from the original memory location, which now contains only the points shown in FIG. 10.

The system then returns to step 1305 to determine whether any starting points are left. Since there are, the system moves to to the next starting point, point 909, and begins the path walk algorithm of FIG. 12 again at step 1306.

Returning again to FIG. 12, and beginning at step 1201, the system next moves to step 1202 to ask whether point 909 is at an intersection. Since it is, at step 1205 point 909 and its next point, 910, are examined. At step 1206, the system asks whether the next point, 910, is the most clockwise point examined at this intersection point. Since all of the points have not been examined at this intersection point, the system moves to step 1208 to ask whether there are any other intersection points left or whether point 909 is the last point at the intersection. Since it is not, the system moves to step 1209 to advance to the next point at the intersection, point 920. At 1205, point 920 is examined along with its next point, point 921. At step 1206, the next points, points 921 and 910 are examined to determine which is the most clockwise point looking from curve 909, 910. Since point 910 is the most clockwise point, at step 1207, point 910 is saved as the Best point. Since all of the points have been examined at this intersection point, the system moves from step 1208 to step 1210 where the algorithm then advances to the Best point, point 910.

Returning to step 1202, the system asks whether point 910 is at an intersection. Since it is not, the system at step 1203 then selects the next point, point 911. At step 1204, the system asks whether this is the original point where this path walk process had begun. The original point for this path walk process is point 909. Therefore, the system returns to step 1202 to ask whether point 911 is at an intersection. Since it is not, 912 is then selected as the next point at step 1203. Since 912 is not the original point, point 909, the system returns to step 1202 from step 1204. Since 912 is at an intersection, the system moves to step 1205 to examine point 912 and its next point, point 913. In step 1206 the system asks whether this next point, point 913, is the most clockwise point examined at this intersection point. Since it is not, the system moves to step 1208 to ask whether point 912 is the last point of the intersection. Since it is not, the system at step 1209 advances to the next point at the intersection, point 921. At step 1205, point 921 and its next point, point 922 are examined. At step 1206, point 922 is examined to determine whether or not it is the most clockwise point examined at this intersection point. Since it is, at step 1207, point 922 is saved as the Best point. Next, at step 1208, it is determined that all of the points at the intersection have been examined. Therefore, the system moves to step 1210, where the algorithm advances to the Best point, point 922. Next at step 1202, the system asks whether point 922 is at an intersection. Since it is not, at step 1203, the next point, 901, is selected. At step 1204, it is asked whether or not point 901 is the original point. Since the original point is point 909, point 901 is not the original point, and the system returns to step 1202. Since point 901 is not at an intersection the system moves to step 1203 to select the next point along the curve, point 902. Since point 902 is not the original point, the system then returns to step 1202. Since point 902 is at an intersection, the system moves to step 1205 to examine point 902 and its next point. However, point 902's next point, point 903 has been deleted as a result of the previous path walk. Thus, at step 1206, the next point cannot be examined. Therefore, the system moves to step 1208 to determine whether point 902 is the last point at this intersection. Since it is not, the system advances to the next point at the intersection, point 913. Next, at step 1205, point 913 and its next point, point 914 are examined. At step 1206, point 914 is examined to determine whether or not it is the most clockwise point examined at this intersection point. Since it is, at step 1207, point 914 is saved as the Best point. Since all of the points at the intersection have been examined, the system moves from step 1208 to step 1210 where it advances to the Best point, point 914.

Next, at step 1202, the system asks whether point 914 is at an intersection. Since it is not, it then selects the next point, 915. The system will then cycle through steps 1202–1204 as it path walks around through points 915, 916, 917, 918 and 919 since none of these points lie at an intersection nor or none of these points the original point, point 909. When point 920 is then reached, the system at step 1204 asks whether point 920 is the original point. Since point 920 is the same point as point 909, this is true. Therefore, the algorithm of FIG. 12 ends at step 1211 and the system returns to step 1306 in FIG. 13.

Next, at step 1307, the system asks whether the path walk of FIG. 12 ended at the last starting point. Since this is true, the system moves to step 1308 where all the points that were path walked, points 909, 910, 911, 921, 922, 901, 913, 914, 915, 916, 917, 918 and 919, are marked, or outputted from the original memory location and transferred to another memory location. These points are also deleted from the original memory location if two separate memory locations are utilized. The system then moves to step 1305 to ask whether there are any starting points left. Since the original starting points were points 903, 909, 913 and 921, there are no starting points left. Therefore, the system ends at step 1309. The points that remain "unmarked", or remain in the original memory location, are points 902, 908, 920 and 912 as depicted in FIG. 11.

The points that have been "marked" or transferred to the second memory location are then utilized to construct a non-overlapping calligraphic image as shown in FIG. 6. This image can be filled in as shown in FIG. 7, or edited by moving any one the points along the curve as shown in FIG. 8, including the path walked points from the original intersection points where the calligraphic image overlapped itself. The image can now be modified at these points without adversely distorting the entire calligraphic image as shown in FIG. 8.

Although the present invention and its advantages have been described in detail, it should be understood that various changes, substitutions and alterations can be made herein without departing from the spirit and scope of the invention as defined by the appended claims.

What is claimed is:

1. A method of creating a complex calligraphic image of a line with self-overlapping segments, said method comprising the steps of:

accepting data representative of the width of the line to be created, and an input pen angle for said calligraphic line;

accepting data representative of a direction of the line to be created; and constructing said calligraphic image of said line concurrently as said line direction is accepted, said constructed image line moving at a constant constructed pen angle in accordance with said accepted input pen angle data.

2. The method of creating the complex calligraphic image as set forth in claim 1 further including the steps of:

establishing editable points along said constructed image, said points including intersection points for defining the points of overlap of said image segments; and modifying said constructed complex calligraphic image wherein the points where said image self-overlaps are editable without affecting the position of the remaining intersection points.

3. The method of creating the complex calligraphic image as set forth in claim 1 further including the step of:

substituting an outline for said constructed calligraphic image immediately upon the cessation of said accepted line direction data.

4. The method of creating the complex calligraphic image as set forth in claim 3 further including the step of:

redefining said outline of said constructed calligraphic image whereby no points lying upon portions of said outline lie within said outline of said image.

5. The method of creating the complex calligraphic image as set forth in claim 3 wherein said constructed calligraphic image is composed from points lying upon the portions of said outline outside of said image.

6. The method of creating the complex calligraphic image as set forth in claim 1 wherein said constructing step includes:

maintaining the pen angle at the start point of the image line and the pen angle at the end point of the image line equal to said accepting pen angle data.

7. The method of creating the complex calligraphic image as set forth in claim 1 further including the step of:

modifying said constructed calligraphic image of said line by changing said pen angle data while said direction data is being received.

8. The method of creating the complex calligraphic image as set forth in claim 1 further including the step of:

modifying said constructed calligraphic image of said line by changing said width information while said direction data is being received.

9. The method set forth in claim 1 wherein said direction information accepting step includes the step of receiving data from an object moving across a surface to define said desired line direction.

10. The method set forth in claim 9 wherein said width information is accepted from pressure data generated between said object and said surface during the course of movement of said object.

11. The method set forth in claim 9 wherein said width information is accepted from a source external to said object.

12. The method set forth in claim 11 wherein said external source is a key pad.

13. The method set forth in claim 9 wherein said object is a mouse.

14. The method set forth in claim 1 wherein said direction information accepting step includes the step of receiving data from a stylus moving within a fluid medium.

15. The method set forth in claim 14 wherein said width information is dependent upon the depth of said stylus within said fluid medium.

16. The method of creating the complex calligrahic image as set forth in claim 1 wherein said direction information accepting step includes the step of receiving data from a stylus moving with respect to a surface.

17. The method of creating the complex calligraphic image as set forth in claim 16 wherein an end of said stylus is a calligraphic pen tip and wherein said angle is controlled by the angle of said pen tip at any point along said pen tip's trajectory.

18. The method of creating the complex calligraphic image as set forth in claim 16 wherein said width data is provided by the pressure of said stylus against said surface.

19. A system for creating a complex calligraphic image of a line with self-overlapping segments, said system comprising:

means for accepting data representative of the width of the line to be created, and an input pen angle for said calligraphic line;

means for accepting data representative of a direction of the line to be created; and means for constructing said complex calligraphic image of said line concurrently as said line direction is accepted, said constructed image line moving at a constant constructed pen angle in accordance with said input accepted pen angle data.

20. The system for creating the complex calligraphic image as set forth in claim 19 further including:

means for establishing editable points along said constructed image, said points including intersection points for defining the points of overlap of said image segments; and means for modifying said constructed complex calligraphic image wherein the points where said image self-overlaps are editable without affecting the position of the remaining intersection points.

21. The system for creating the complex calligraphic image as set forth in claim 19 further including:

means for substituting an outline for said constructed calligraphic image immediately upon the cessation of said accepted line direction data.

22. The system for creating the complex calligraphic image as set forth in claim 21 wherein said constructed calligraphic image is composed from points lying upon the portions of said outline outside of said image.

23. The system for creating the calligraphic image as set forth in claim 19 wherein said means for constructing includes:

means for maintaining the pen angle at the start point of the image line and the pen angle at the end point of the image line equal to said accepting pen angle data.

24. The system for creating the complex calligraphic image as set forth in claim 19 further including:

means for modifying said constructed calligraphic image of said line by changing said per angle data while said direction data is being received.

25. The system for creating the complex calligraphic image as set forth in claim 19 further including:

means for modifying said constructed calligraphic image of said line by changing said width information while said direction data is being received.

26. The system for creating the complex calligraphic image as set forth in claim 19 wherein said means for accepting direction information includes means for receiving data from a stylus moving with respect to a surface.

27. The system for creating the complex calligraphic image as set forth in claim 26 wherein an end of said stylus is a calligraphic pen tip and wherein said angle is controlled by the angle of said pen tip at any point along said pen tip's trajectory.

28. The system for creating the complex calligraphic image as set forth in claim 26 wherein said width data is provided by the pressure of said stylus against said surface.

29. The system for creating the complex calligraphic image as set forth in claim 19 wherein said direction information accepting step includes the step of receiving data from an object moving across a surface to define said desired line direction.

30. The system for creating the complex calligraphic image as set forth in claim 29 wherein said width information is accepted from pressure data generated between said object and said surface during the course of movement of said object.

31. The system for creating the complex calligraphic image as set forth in claim 29 wherein said width information is accepted from a source external to said object.

32. The system for creating the complex calligraphic image as set forth in claim 31 wherein said external source is a key pad.

33. The system for creating the complex calligraphic image set forth in claim 29 wherein said object is a mouse.

34. The system for creating the complex calligraphic image set forth in claim 19 wherein said direction information accepting step includes the step of receiving data from a stylus moving within a fluid medium.

35. The system for creating the complex calligraphic image set forth in claim 34 wherein said width information is dependent upon the depth of said stylus within said fluid medium.

36. A system for generating a font image having calligraphic characteristics with overlapping segments, said system comprising:

means for accepting data representative of the width for each curve in said font image, and an input pen angle for each said curve;

means for accepting data representative of a direction of each desired curve in said font image;

means for constructing each said curve of said font image concurrently as said curve direction is accepted, said constructed font curve moving at a constant constructed pen angle in accordance with said accepted input pen angle data; and means for generating a spine of said direction data, said spine being the longitudinal center line of said constructed calligraphic font image, said spine containing points there along, each said point having data associated therewith pertaining to said width and said pen angle for said calligraphic font image, wherein said spine angle data is expressed in Cartesian coordinates representative of said angle at said point, said coordinates used in conjunction with said width data at said point to generate one point along a top peripheral outline of said direction and one point along the bottom peripheral outline of said direction, said peripheral points movable to modify said calligraphic font image.

37. The system for generating a font as set forth in claim 36 wherein said accepting means is an object moving across a surface to define said desired position and direction characteristics.

38. The system for generating a font as set forth in claim 37 wherein said object is a stylus having a point of contact with said surface.

39. The system for generating a font as set forth in claim 37 wherein said object is a mouse.

40. The system for generating a font as set forth in claim 36 wherein said accepting means and said generating means are included within a computer system wherein said font is generated within said computer system for display by an output means.

41. The system for generating a font as set forth in claim 40 wherein said output means is a video terminal.

42. The system for generating a font as set forth in claim 40 wherein said output means is a printer.

* * * * *